Dec. 2, 1969  W. S. HYDE  3,481,237
FLYING SHEAR
Filed Nov. 20, 1967
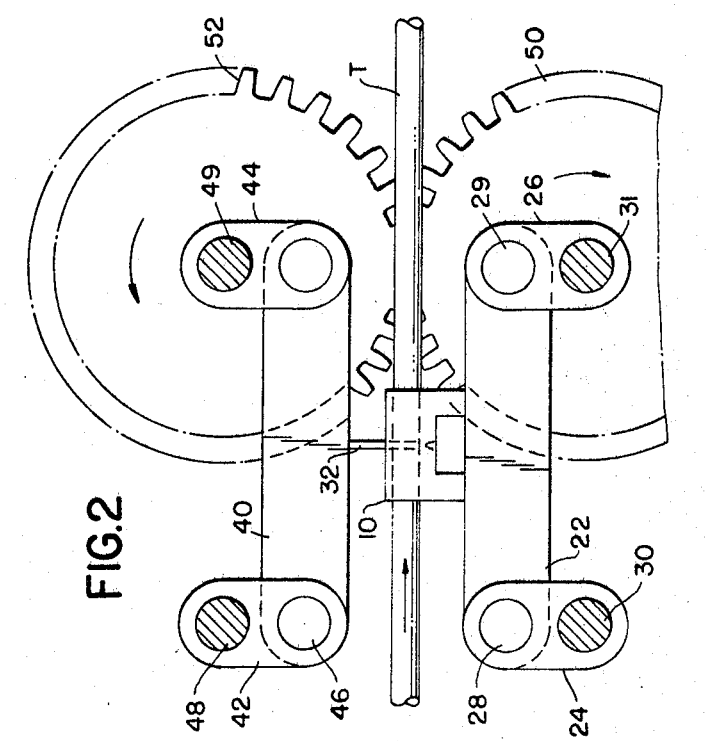
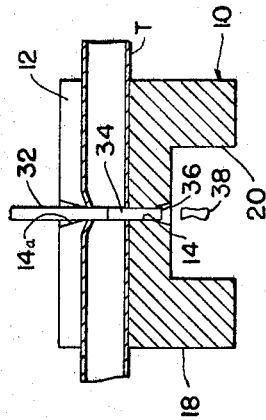
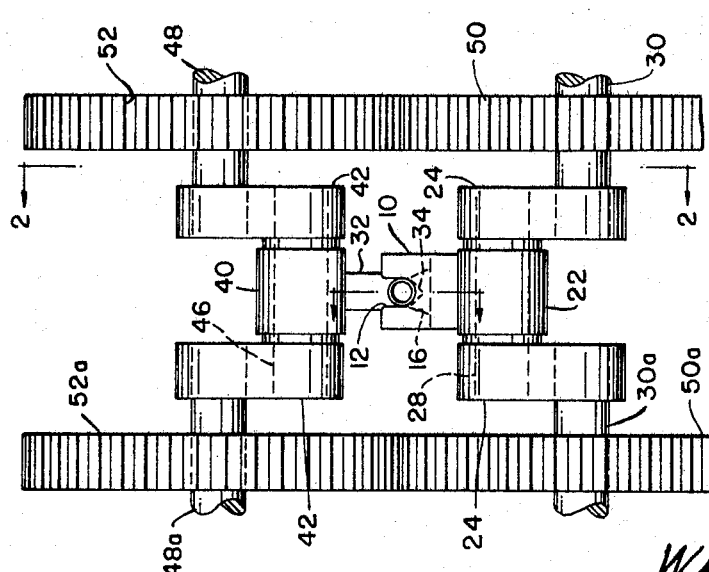
INVENTOR
WILLIAM S. HYDE
BY Whittemore,
Hulbert & Belknap
ATTORNEYS

United States Patent Office 3,481,237
Patented Dec. 2, 1969

3,481,237
FLYING SHEAR
William S. Hyde, Decatur, Ala., assignor, by mesne assignments, to Calumet & Hecla Corporation, Allen Park, Mich., a corporation of Delaware
Filed Nov. 20, 1967, Ser. No. 684,453
Int. Cl. B26d 1/56
U.S. Cl. 83—328          9 Claims

ABSTRACT OF THE DISCLOSURE

A flying shear for severing tubes comprising a recessed die block having an elongated tube receiving recess at one side and an opening extending from the bottom of the recess to the opposite side of the block, a blade movable transversely of the recess to sever a tube received therein and eject the chip through the opening, and means for moving the die block and blade along the path of advance of a tube in substantial synchronism therewith and for moving the blade and die block toward each other to sever the tube.

Field of the invention

The flying shear is intended for use in severing continuously advancing tubing without interrupting the advance of the tubing. It is a requirement of the tube severing apparatus that the severed tube ends shall be substantially open so as to permit insertion of a tool to round the tube end and if desired, to chamfer it.

Summary of the invention

The flying shear of the present invention comprises a die block having an elongated recess at one side thereof shaped to receive and support continuously advancing tubing. The die block is provided with an opening extending from the bottom of the recess to the opposite side of the block. Associated with the die block is a cutting blade having a cutting end positioned to extend across the recess and movable into the opening to sever the tube and to eject a chip cut from the tube during the severing operation.

The die block and blade are driven in synchronism in intersecting paths, preferably circular, so that during a part of the path of movement the die block and blade have a component of movement longitudinally of the advancing tubing substantially equal in speed to the speed of advance of the tubing. In addition, the die block and blade have relative movement toward and away from each other. On movement toward each other they are moving in the same direction as the tubing and sever the tubing without interruption of its movement. Thereafter, the die block and blade separate and move reversely or in a direction contra to the direction of movement of the tubing to a starting position preparatory to a subsequent severing operation.

It is accordingly an object of the present invention to provide a flying shear capable of severing a tube which is advancing at relatively high speed in an operation which leaves the severed ends of the tube sufficiently open to permit introduction of a tool for re-rounding, and if desired, chamfering the tube ends.

More specifically, it is an object of the present invention to provide a die block having a relatively deep tube receiving groove, a blade movable transversely of the groove to sever a tube end, and means for moving the die block and blade in synchronism in a generally circular closed path in opposite directions so that upon approach between the die block and blade, the die block and blade are moved in the same direction at approximately the same speed as the tube.

Other objects and features of the invention will become apparent as the description proceeds, especially when taken in conjunction with the accompanying drawing, illustrating a preferred embodiment of the invention.

Brief description of the drawing

FIGURE 1 is an end view of the flying shear.
FIGURE 2 is a section on the line 2—2, FIGURE 1.
FIGURE 3 is a section, on an enlarged scale, on the line 3—3, FIGURE 1.
FIGURE 4 is a fragmentary elevational view of the cutting blade.

Description of the preferred embodiment

The flying shear disclosed herein comprises a die block 10 having a relatively deep groove or recess 12 at one side thereof. As illustrated herein, the groove or recess 12 extends downwardly from the top surface of the block 10. The bottom of the recess 12 is of semi-cylindrical configuration and is adapted to engage with and interfit the under-surface of a tube T. Intermediate its ends the die block is provided with a transverse rectangular slot 14, the lower edge walls of which diverge as indicated at 16 in FIGURE 1. The block 10 includes supporting legs 18 leaving an opening 20 therebetween for chip disposal.

The block 10 is mounted on a link 22 opposite ends of which are pivotally connected to pairs of parallel crank arms 24 and 26, the pivot connections being indicated at 28 and 29 respectively. Crank arms 24 and 26 are carried by stationary support members (not shown) and are mounted thereon for rotation about pivot support shafts 30 and 31. Associated with the die block 10 is a cutting blade 32 formed of rectangular stock shaped to interfit closely into the rectangular slot 14. The lower end of the blade 32 has tapered end portions 34 causing the blade to terminate in a sharp cutting edge 36 which joins sharp cutting edges formed by the intersections between the flat side of the blade and the inclined end surfaces 34 thereof.

With this arrangement movement of the blade 32 to the position illustrated in FIGURE 3 will cause the cutting end of the blade to traverse the tube T, servering the tube and cuting a chip 38 therefrom which is ejected into the space between the legs 20.

The blade 32 is connected to an elongated link 40 which is pivotally connected to pairs of parallel crank arms 42 and 44 as indicated at 46. The crank arms 42 and 44 are carried by the stationary support (not shown) and are mounted therein for rotation about pivot support shafts 48 and 49.

The crank arm 26 is fixedly connected to pivot support shaft 31 to be driven thereby. Also connected to shaft 31 is gear 50. Similarly, crank arm 44 is fixedly connected to pivot support shaft 49 to be driven thereby, and pivot support shaft 49 is fixedly connected to a second gear 52, identical with the gear 50 and in mesh therewith.

As best seen in FIGURE 1, additional gears 50a and 52a, fixed to shafts 30a and 48a and corresponding to gears 50, 52 and shafts 30, 48 respectively, are provided for driving one of the crank arms 24 and 42 respectively of each pair.

Drive of the mechanism may be through any of the shafts, as for example the shaft 30. The gear sets 50, 52 and 50a, 52a insure synchronous rotation and synchronous movements of the links 22 and 44. The motion of these links and of each element carried thereby is in a circular path of a radius equal to the effective length of each of the crank arms 24, 26 and 42, 44.

Referring to FIGURE 2, if it be assumed that the direction of advance of the tube T is from left to right as indicated by the arrow superimposed on the tube, then the rotation of the gears 50 and 52 is in the direction shown by the arrow superimposed thereon. Similarly, the links 22 and 40 are moved in synchronism and in the instantaneous position shown in FIGURE 2 are moving to the right. By appropriately selecting the speed of rotation of the input gear 50, the block 10 and cutting blade 32 may be given a left to right component of movement during the cutting action which results in severance of the tube, which is substantially equal to the average speed of advance of the tube T. Moreover, the present design permits rapid advance of the tube T and a corresponding rapid rotation of the gears.

From the position shown in FIGURE 2, continued advance of the tube results in continuous rightward movement of the die block 10 and blade 32 accompanied by an upward withdrawing movement of the blade 32 and a corresponding downward withdrawing movement of the die block 10. When the gears 50, 52 have completed 180 degrees of rotation the die block 10 and blade 32 are in the position of furthest separation and are moving from right to left contra to the direction of advance of the tube T.

Actuation of the tube cut-off or flying shear is by effecting a substantially 360 degree rotation of the input gear so that the die block and blade come to rest in a position of clearance with respect to the tubing, which is thus permitted to continue its rapid advance without interruption. The next actuation of the drive means for the gear 50 causes a complete rotation of the drive gears during which the blade and die block move towards each other and acquire a component of movement parallel to the path of advance of the tube T, the speed of which may be approximately equal to the speed of tube advance.

Upon further separation between the die block and blade with the parts dimensioned as shown, it will be observed that the blade 32 is completely separated from the die block 10. In order to insure entry of the cutting end of the blade 32 into the slot 14, the upper edge of the slot is preferably inclined as indicated at 14a.

It will be observed that the recess 12 is substantially deeper than the diameter of the tube T so that the tube is received in and partially supported by the recess 12 when the upper surface thereof is engaged by the pointed end of the cutting blade 32.

As illustrated in FIGURE 3, the initial action of the blade 32 in severing the tube T by removal of the chip 38 is a slight deformation or dimpling of the tube T as indicated in the figure. However, this deformation or dimpling of the tube is relatively minor and the severed ends of the tubes produced by this operation may be restored to circular configuration by inserting a rounding tool into the open ends thereof and this operation may if desired, include chamfering of the severed ends of the tube.

While the edge surface 34 of the cutting blade 32 at the end thereof may be a flat surface, it is also possible to provide the blade as seen at 32a in FIGURE 4 where the transversely pointed end portion may be formed by grinding transversely concave surfaces 34a therein.

The drawing and the foregoing specification constitute a description of the improved flying shear in such full, clear, concise and exact terms as to enable any person skilled in the art to practice the invention, the scope of which is indicated by the appended claims.

What I claim as my invention is:

1. Flying shear tube severing mechanism comprising a die block having an elongated tube receiving and supporting recess in one side thereof, said block having an opening extending from the bottom of said recess to the opposite side of said block, a cutter blade movable transversely of said recess and having a cross-sectional shape conforming to the shape of the opening, said blade and opening having a dimension transverse to the length of said recess so as to extend laterally beyond both sides thereof, means for synchronously moving said block and blade longitudinally of an advancing tube at a speed substantially equal to the speed of advance of the tube and simultaneously transversely of the tube toward each other to cause said blade to sever the tube and eject the chip through said opening.

2. A mechanism as defined in claim 1 in which the means for moving said block and blade comprises means for moving them in overlapped circular paths to provide for separation of said block and blade following each severing operation, and return movement contra to the direction of movement of the tube.

3. A mechanism as defined in claim 2 in which the circular paths of movement of the blade and block have equal radii several times the diameter of the tube.

4. A mechanism as defined in claim 3 in which the elongated recess in said block has a depth greater than the diameter of the tube.

5. A mechanism as defined in claim 1 in which said opening and blade are of rectangular cross-section, and said blade is tapered to a tube piercing configuration at its end adjacent said die block.

6. A mechanism as defined in claim 5 in which the piercing configuration of said blade comprises a sharp edge transverse to the width of said blade.

7. A mechanism as defined in claim 5 in which the tapered end surfaces of said blade are concavely formed.

8. A mechanism as defined in claim 1 in which the means for synchronously moving said blade and block comprise pairs of crank arms of equal length, a link joining the ends of the crank arms of each pair, and drive means for rotating each pair of crank arms in opposite directions at identical speeds.

9. A mechanism as defined in claim 8 in which the drive means comprises identical gears each connected to one of the crank arms of each pair and in mesh with each other.

References Cited

UNITED STATES PATENTS

| | | | |
|---|---|---|---|
| 2,407,253 | 9/1946 | Conner | 83—327 X |
| 2,582,025 | 1/1952 | Frank et al. | 83—320 X |
| 2,693,630 | 11/1954 | Rodder | 83—327 X |
| 2,741,309 | 4/1956 | Czarnik | 83—320 X |
| 3,129,624 | 4/1964 | Auer | 83—320 X |

WILLIAM S. LAWSON, Primary Examiner